US012578271B2

(12) United States Patent
Dai et al.

(10) Patent No.: US 12,578,271 B2
(45) Date of Patent: Mar. 17, 2026

(54) GRAM-STAIN DIFFERENTIATION WITH NONLINEAR LIGHT SCATTERING

(71) Applicant: Temple University—Of The Commonwealth System of Higher Education, Philadelphia, PA (US)

(72) Inventors: Hai-Lung Dai, Wynnewood, PA (US); Mohammad Sharifian, Charlottesville, VA (US); Michael Wilhelm, Audubon, NJ (US)

(73) Assignee: Temple University -Of The Commonwealth System of Higher Education, Philadelphia, PA (US)

( * ) Notice: Subject to any disclaimer, the term of this patent is extended or adjusted under 35 U.S.C. 154(b) by 141 days.

(21) Appl. No.: 18/252,724

(22) PCT Filed: Nov. 12, 2021

(86) PCT No.: PCT/US2021/059221
§ 371 (c)(1),
(2) Date: May 12, 2023

(87) PCT Pub. No.: WO2022/104125
PCT Pub. Date: May 19, 2022

(65) Prior Publication Data
US 2023/0417669 A1 Dec. 28, 2023

Related U.S. Application Data

(60) Provisional application No. 63/112,873, filed on Nov. 12, 2020.

(51) Int. Cl.
*G01N 21/63* (2006.01)

(52) U.S. Cl.
CPC .................................. *G01N 21/636* (2013.01)

(58) Field of Classification Search
CPC .. G01N 21/636; G01N 15/1433; G01N 15/01; G01N 15/1434; G01N 15/1429; G01N 2015/0038
See application file for complete search history.

(56) References Cited

U.S. PATENT DOCUMENTS

| | | | | |
|---|---|---|---|---|
| 4,952,497 A | * | 8/1990 | Bhaduri | ................... C12Q 1/04 435/6.15 |
| 2002/0094520 A1 | | 7/2002 | Salafsky | |
| 2003/0228703 A1 | * | 12/2003 | Hoppe | ............... G01N 21/6408 436/172 |
| 2006/0291772 A1 | * | 12/2006 | Haiml | ................ G01N 21/6452 385/16 |

(Continued)

OTHER PUBLICATIONS

Beveridge, T. J., "Mechanism of gram variability in select bacteria," Journal of Bacteriology, vol. 172, No. 3 (1990), pp. 1609-1620.

(Continued)

*Primary Examiner* — Sang H Nguyen
(74) *Attorney, Agent, or Firm* — Riverside Law LLP

(57) ABSTRACT

The present invention generally relates to improved methods for characterizing the cell wall complex composition of a bacterial specimen via differential transport kinetics of a small molecule. The present invention also relates to improved and automated methods for Gram differentiation of a bacterial specimen using nonlinear optical techniques.

12 Claims, 6 Drawing Sheets

(56)　　　　　　　References Cited

U.S. PATENT DOCUMENTS

2009/0111088 A1　4/2009　Martin
2012/0122966 A1*　5/2012　Kutushov ............ A61K 31/045
　　　　　　　　　　　　　　　　　　514/574
2014/0295413 A1*　10/2014　Cohen .............. G01N 33/54373
　　　　　　　　　　　　　　　　　　435/6.1
2015/0119270 A1*　4/2015　Salafsky ............ G01N 33/6845
　　　　　　　　　　　　　　　　　　435/7.1
2015/0233820 A1*　8/2015　Roke .................... G01N 21/636
　　　　　　　　　　　　　　　　　　356/338
2018/0031572 A1*　2/2018　Cohen .................... C12N 15/62
2018/0094292 A1　4/2018　Hasan
2020/0237346 A1*　7/2020　Sawyer ................ A61B 8/5207
2020/0325525 A1*　10/2020　Anderson ................ C12N 1/02

OTHER PUBLICATIONS

Beveridge, T. J., "Use of the Gram stain in microbiology," Biotechnic & Histochemistry, vol. 76, No. 3 (2001), pp. 111-118.

Beveridge, T. J., et al., "Cellular Responses of Bacillus subtilis and Escherichia coli to the Gram Stain," Journal of Bacteriology, vol. 156, No. 2 (1983), pp. 846-858.

Chen, S.-L., et al., "Simple physics in and easy manipulating of the interfacial behavior of charged molecules on drug delivery vesicles," Materials Today Physics, vol. 9 (2019), Article 100092, 9 pages.

Eisenthal, K. B., "Second Harmonic Spectroscopy of Aqueous Nano- and Microparticle Interfaces," Chemical Reviews, vol. 106, No. 4 (2006), pp. 1462-1477.

Fagan, R. P., et al., "Biogenesis and functions of bacterial S-layers," Nature Reviews Microbiology, vol. 12, No. 3 (2014), pp. 211-222.

Gayen, A., et al., "Unveiling the Modulating Role of Extracellular pH in Permeation and Accumulation of Small Molecules in Subcellular Compartments of Gram-negative Escherichia coli using Non-linear Spectroscopy," Analytical Chemistry, vol. 91, No. 12 (2019), pp. 7662-7671.

Gh, M. S., et al., "Azithromycin-Induced Changes to Bacterial Membrane Properties Monitored in Vitro by Second-Harmonic Light Scattering," ACS Medicinal Chemistry Letters, vol. 9, No. 6 (2018), pp. 569-574.

Gh, M. S., et al., "Label-Free Optical Method for Quantifying Molecular Transport Across Cellular Membranes In Vitro," Journal of Physical Chemsitry Letters, vol. 7, No. 17 (2016), pp. 3406-3411.

Gh, M. S., et al., "Spatially Resolved Membrane Transport in a Single Cell Imaged by Second Harmonic Light Scattering," Biochemistry, vol. 58, No. 14 (2019), pp. 1841-1844.

Gonella, G., et al., "Second Harmonic Light Scattering from the Surface of Colloidal Objects: Theory and Applications," Langmuir, vol. 30, No. 10 (2014), pp. 2588-2599.Wilhelm, M. J., et al., "Nonlinear Light Scattering from Buried Interfaces: Fundamentals and Applications," Emerging Trends in Chemical Applications of Lasers, Chapter 9 (Oct. 27, 2021), pp. 173-198.

Hamal, P., et al., "Molecular Adsorption and Transport at Liposome Surfaces Studied by Molecular Dynamics Simulations and Second Harmonic Generation Spectroscopy," Journal of Physical Chemistry B, vol. 123, No. 36 (2019), pp. 7722-7730.

Hou, Y., et al., "Understanding the Dynamic Behavior of an Anticancer Drug, Doxorubicin, on a Lipid Membrane Using Multiple Spectroscopic Techniques," Journal of Physical Chemistry B, vol. 123, No. 17 (2019), pp. 3756-3762.

Hynonen, U., et al., "Lactobacillus surface layer proteins: structure, function and applications," Applied Microbiology and Biotechnology, vol. 97, No. 12 (2013), pp. 5225-5243.

Kumal, R. R., et al., "Impacts of Salt, Buffer, and Lipid Nature on Molecular Adsorption and Transport in Liposomes As Observed by Second Harmonic Generation," vol. 121, No. 29 (2017), pp. 15851-15860.

Miller et al., "Second Harmonic Generation Spectroscopy of Membrane Probe Dynamics in Gram-Positive Bacteria", Biophysical Journal, vol. 117, No. 8 (Oct. 15, 2019), pp. 1419-1428.

Miller, L. N., et al., "Second Harmonic Generation Spectroscopy of Membrane Probe Dynamics in Gram-Positive Bacteria," Biophysical Journal, vol. 117, No. 8 (2019), pp. 1419-1428.

Roke, S., et al., "Nonlinear Light Scattering and Spectroscopy of Particles and Droplets in Liquids," Annual Review of Physical Chemistry, vol. 63 (2012), pp. 353-378.

Samuel, L. P., et al., "Multicenter Assessment of Gram Stain Error Rates, "Journal of Clinical Microbiology, vol. 54, No. 6 (2016), pp. 1442-1447.

Sara, M., et al., "S-Layer Proteins," Journal of Bacteriology, vol. 182, No. 4 (2000), pp. 859-868.

Shang, X., et al., "Effects of Counterions on Molecular Transport Across Liposome Bilayer: Probed by Second Harmonic Generation," The Journal of Physical Chemistry B, vol. 105, No. 51 (2001), pp. 12816-12822.

Srivastava, A., et al., "Kinetics of molecular transport across a liposome bilayer," Chemical Physics Letters, vol. 292, No. 3 (1998), pp. 345-351.

Thomson, R. B. Jr., "One Small Step for the Gram Stain, One Giant Leap for Clinical Microbiology," Journal of Clinical Microbiology, vol. 54, No. 6 (2016), pp. 1416-1417.

Tran, R. J., et al., "Applications of Surface Second Harmonic Generation in Biological Sensing," Annual Review of Analytical Chemistry (Palo Alto, Calif.), vol. 10, No. 1, pp. 387-414, Mar. 16, 2017.

Varshney, G. K., et al., "Effect of Curcumin Addition on the Adsorption and Transport of a Cationic Dye across DPPG-POPG Liposomes Probed by Second Harmonic Spectroscopy," Langmuir, vol. 33, No. 33 (2017), pp. 8302-8310.

Wilhelm et al., "Molecule-Membrane Interactions in Biological Cells Studied with Second Harmonic Light Scattering", Chemistry An Asian Journal, vol. 15, No. 2 (Nov. 13, 2019), pp. 200-213.

Wilhelm, M. J., "Determination of bacterial surface charge density via saturation of adsorbed ions," Biophysical Journy, vol. 120, No. 12, pp. 2461-2470, Jun. 15, 2021.

Wilhelm, M. J., et al., "Chemically Induced Changes to Membrane Permeability in Living Cells Probed with Nonlinear Light Scattering," Biochemistry, vol. 54, No. 29 (2015), pp. 4427-4430.

Wilhelm, M. J., et al., "Gram's Stain Does Not Cross the Bacterial Cytoplasmic Membrane," ACS Chemical Biology, vol. 10 (2015), pp. 1711-1717.

Wilhelm, M. J., et al., "Influence of molecular structure on passive membrane transport: A case study by second harmonic light scattering," The Journal of Chemical Physics, vol. 150 (2019), Article 104705. 9 pages.

Wilhelm, M. J., et al., "Real-time molecular uptake and membrane-specific transport in living cells by optical microscopy and nonlinear light scattering," Chemical Physics Letters, vol. 605-606 (2014), pp. 158-163.

Yan, E. C., et al., "Effect of cholesterol on molecular transport of organic cations across liposome bilayers probed by second harmonic generation," Biophysical Journal, vol. 79, No. 2 (2000), pp. 898-903.

Zeng, J., et al., "Adsorption and transport of charged vs. neutral hydrophobic molecules at the membrane of murine erythroleukemia (MEL) cells," Colloids and Surfaces B: Biointerfaces, vol. 127 (2015), pp. 122-129.

Zeng, J., et al., "Time-Resolved Molecular Transport across Living Cell Membranes," Biophysical Journal, vol. 104, No. 1 (2013), pp. 139-145.

* cited by examiner

GRAM-STAIN DIFFERENTIATION WITH NONLINEAR LIGHT SCATTERING

CROSS-REFERENCE TO RELATED APPLICATIONS

This application claims priority to U.S. Provisional Patent Application No. 63/112,873, filed Nov. 12, 2020, the contents of which are incorporated by reference herein in its entirety.

STATEMENT REGARDING FEDERALLY SPONSORED RESEARCH OR DEVELOPMENT

This invention was made with government support under Grant No. CHE-1465096 awarded by the National Science Foundation and under Grant No. FA9550-19-1-0253 awarded by the Air Force Office of Scientific Research. The government has certain rights in the invention.

BACKGROUND OF THE INVENTION

The traditional Gram-stain method is a century old protocol that is still widely used as the first step in the identification of unknown bacterial samples. Specifically, differentiating bacteria into either Gram-positive or Gram-negative cells is based on the ultrastructure of their cell walls (C. Friedlander, *Fortschr. Med.* 1883, 1: 715-733; H. C. Gram, *Fortschr. Med.* 1884, 2: 185-189). FIG. 1, comprising FIGS. 1A and 1B, depicts a cartoon cross-section schematic of the general cell wall characteristics for Gram-positive (FIG. 1A; left) and Gram-negative bacteria (FIG. 1B; right). Specifically, Gram-negative cells have a pair of phospholipid membranes: a lipopolysaccharide (LPS)-coated outer membrane (OM) that is perforated with water-filled outer membrane protein (Omp) channels, that permit passive diffusion, as well as an inner cytoplasmic membrane (CM). These dual membranes are separated by a thin single layer of peptidoglycan mesh (PM) which acts as a diffusion barrier. Conversely, Gram-positive cells contain only a single inner CM that is surrounded by multiple layers of PM. Additionally, Gram-positive cells also have an outer surface layer (or s-layer; SL), of crystallized protein. The SL is known to contain regularly spaced pores (ca. 2-8 nm wide) which permit passive diffusion, similar to the Omp channels in the OM of Gram-negative strains (M. Sára, et al., J. Bacteriol. 2000, 182: 859-868; U. Hynönen, et al., *Appl. Microbiol. Biotechnol.* 2013, 97: 5225-5243; R. P. Fagan, et al., *Nat. Rev. Microbiol.* 2014, 12: 211-222).

In a recent study, time-resolved second-harmonic light scattering (SHS) and time-resolved bright-field transmission microscopy were used to interrogate the molecular mechanism of the Gram-stain (M. J. Wilhelm, et al., *ACS Chem. Biol.* 2015, 1711-1717). Briefly, SHS is a surface sensitive technique based upon the nonlinear optical phenomenon, second-harmonic (SH) generation, the fundamentals of which have already been described in great detail (K. B. Eisenthal, *Chem. Rev.* 2006, 106: 1462-1477; S. Roke, et al., *Annu. Rev. Phys. Chem.* 2012, 63: 353-378; G. Gonella, et al., *Langmuir.* 2013, 30: 2588-2599; Wilhelm, M. J. & Dai, H., in *Emerging Trends in Chemical Applications of Lasers* (eds. Berman, M. R., Young, L. & Dai, H.-L.), 173-198 (*ACS Symposium Series,* 2021); Tran R J, Sly K L, Conboy J C., *Annu. Rev. Anal. Chem.,* 2017, 10(1):387-414). By taking advantage of the opposing symmetry of a phospholipid bilayer, time-resolved SHS can be used to monitor molecular diffusion across phospholipid membranes in vitro (A.

Srivastava, et al., *Chem. Phys. Lett.* 1998, 292: 345-351; E. C. Y. Yan, et al., *Biophys. J.* 2000, 79: 898-903; G. K. Varshney, et al., *Langmuir.* 2017, 33: 8302-8310; R. R. Kumal, et al., *J. Phys. Chem. C.* 2017, 121: 15851-15860; J. Zeng, et al., *Biophys. J.* 2013, 104: 139-145; M. J. Wilhelm, et al., *ACS Chem. Biol.* 2015, 10: 1711-1717; M. J. Wilhelm, et al., *Biochemistry.* 2015, 54: 4427-4430; J. Zeng, et al., *Colloids Surfaces B: Biointerfaces.* 2015, 127: 122-129; R. J. Tran, et al., *Annu. Rev. Anal. Chem.* 2017, 10: 387-414; Wilhelm M J, Dai H L., Chem. Asian. J., 2020, 15(2):200-213; Gayen A, et al., *Anal. Chem.,* 2019, 91(12):7662-7671; Miller L N, et al., *Biophys.* 1, 2019, 117(8):1419-1428; Hou Y, et al., *J. Phys. Chem. B.,* 2019, 123(17):3756-3762; Chen, S. L., et al., *Materials Today Physics,* 2019, 9: 100092; Shang, X., et al., *J. Phys. Chem. B.,* 2001, 105: 12816-12822). As demonstrated recently, this can even be used as an imaging modality (Sharifian Gh M, etal., *Biochemistry.* 2019, 58(14):1841-1844). The general operating principles for monitoring membrane adsorption and transport with SHS are as follows: Any molecule lacking inversion symmetry has the ability to scatter light at twice the frequency of a strong incident field (i.e., incident $\omega=800$ nm light scatters at $2\omega)=400$ nm). For an ensemble of such molecules in a liquid, as the molecules orient randomly, the resulting SH radiation destructively sums to zero. However, following electrostatic-driven adsorption of SH active cations onto the outer surface of a membrane bilayer, as the molecules align with similar orientations, their resulting SHS constructively adds up to yield a detectable signal. Further, if the SH active molecules can traverse the bilayer and adsorb onto the opposing interior surface of the membrane, the resulting SHS from the oppositely oriented SH active molecules would be out of phase, resulting in destructive interference and loss of the SHS signal.

Previously, time-resolved SHS from the cationic Gram-stain dye, crystal violet (CV), was monitored as it was taken up by living *E. coli*, a Gram-negative bacterium (M. J. Wilhelm, et al., *ACS Chem. Biol.* 2015, 10: 1711-1717). In stark contrast to the previously accepted interpretation of the Gram-stain mechanism, it was revealed that CV was unable to cross the bacterial CM. This behavior has since been validated in a subsequent study using biomimetic liposomes (composed of the total lipid extract of *E. coli*), in which CV was unable to cross the membrane of the liposome (Wilhelm M J, et al., *J. Chem. Phys.,* 2019, 150(10):104705). Furthermore, it was observed that cationic CV exhibits a strong interaction with the PM. It was previously thought that CV would rapidly traverse the PM but would be trapped as a CV-iodine precipitate in the alcohol washout step (T. J. Beveridge, et al., *J. Bacteriol.* 1983, 156: 846-858; Beveridge T J., *J. Bacteriol.,* 1990, 172(3):1609-1620; Beveridge T J., Biotech. Histochem., 2001, 76(3):111-118). However, even for the comparatively thin PM of *E. coli*, it was observed that CV is kinetically trapped in the PM over the time-scale of the Gram-stain protocol (M. J. Wilhelm, et al., *ACS Chem. Biol.* 2015, 10: 1711-1717). Consequently, given the substantially thicker PM in Gram-positive cells (ca. 100 nm vs. nm), the strong CV-PM interaction should result in a measured SHS signal that is distinctly different from that observed with Gram-negative cells.

The traditional Gram-stain (for identifying bacteria under examination as either Gram-positive or Gram-negative) is among the most commonly performed diagnostic tests in any clinical microbiology lab. The biggest problem with respect to the traditional Gram-stain protocol is the propensity for operator error. The current protocol consists of eight steps any of which, if done improperly, could easily result in ambiguous results and even potentially incorrect classification. A number of the current protocol steps involve the potential to induce significant damage to the bacterial cell wall complex, and hence inadvertently alter the CV-cell interaction. For instance, the first step is heat fixation of the sample (i.e., waving the sample-coated microscope slide over an open flame). The purpose of this step is to adhere the cells to the slide. Unfortunately, this process can also easily kill the cells and/or induce cascading damage to components of the cell wall complex and result in all cells appearing Gram-negative. A subsequent step involves washing out the stain using alcohol, in which Gram-positive cells should retain the stain while Gram-negative cells should lose the stain. The problem, however, is that alcohol is known to denature proteins and dissolve phospholipid membranes. Consequently, similar to the heat fixation step, if the duration of the wash-out step is too long, the cells can easily be damaged and both Gram-positive and Gram-negative cells will be classified as Gram-negative. Conversely, if the duration of the wash-out step is not sufficiently long (i.e., so as to completely remove all stain from Gram-negative bacteria), Gram-negative cells could inadvertently be classified as Gram-positive. Overall, successful application of the Gram-stain protocol requires a highly trained and experienced technician. Even then, however, there is a propensity for different technicians to arrive at conflicting assignments. Indeed, a number of studies have highlighted the existing problem of inter-laboratory reliability with respect to Gram-stain assessments. Due to the propensity for operator error, as well as the potential for ambiguous interpretation, the protocol previously demanded that Gram-stain classification should only ever be done by practicing physicians, rather than trained technicians.

Thus, there is a need in the art for improved systems and methods for Gram-stain differentiation of bacteria. This invention satisfies this unmet need.

SUMMARY OF THE INVENTION

In one embodiment, the present invention comprises a method of determining bacterial cell wall composition comprising the steps of: measuring a first second-harmonic scattering (SHS) signal of a small molecule in a solution to generate a baseline; adding a bacterial specimen to said solution to generate a suspension; measuring a second SHS signal of said suspension to generate a response; and determining whether said response is above or below said baseline.

In one embodiment of the present invention, said measuring of said first or said second SHS signal comprises: exposing said solution or said suspension to a fundamental light source; and detecting the second-harmonic wavelength of said light. In one embodiment, said fundamental light has a wavelength of about 800 nm. In one embodiment, the source of said about 800 nm fundamental light is a titanium-sapphire laser. In one embodiment, said second-harmonic wavelength is about 400 nm.

In one embodiment of the present invention, said about 400 nm second-harmonic wavelength is passed through a band-pass filter and monochromator, detected by a photo-multiplier, amplified, and processed through a correlated photon counting system. In one embodiment, said band-pass filter and monochromator excludes light of a wavelength of said fundamental light.

In one embodiment of the present invention, said small molecule is taken up by said bacterial specimen. In one embodiment, said small molecule comprises a non-symmetric dye. In one embodiment, said non-symmetric dye is crystal violet (CV). In one embodiment, said CV is present at a concentration of at least 35 µM. In one embodiment, said CV is present at a concentration of about 50 µM.

In one embodiment of the present invention, said baseline is measured for between 1-100 seconds. In one embodiment, said response is measured for at least 100 seconds.

In one embodiment of the present invention, said response remaining above said baseline characterizes said bacterial specimen as having a pair of phospholipid membranes. In one embodiment, said bacterial specimen characterized as having a pair of phospholipid membranes is designated as Gram-negative. In one embodiment, said response falling below said baseline characterizes said bacterial specimen as having a single phospholipid membrane. In one embodiment, said bacterial specimen characterized as having a single phospholipid membrane is designated as Gram-positive.

In one embodiment the present invention comprises an imaging method of differentiating Gram-negative and Gram-positive bacteria comprising the steps of: obtaining an optical image of a sample expected to contain one or more strain of bacterium; adding CV to said sample; irradiating said sample with fundamental light; imaging second-harmonic scattering (SHS) light for at least 101 seconds; overlaying the integrated image intensity of said SHS image obtained >100 seconds after CV addition over said optical image of said sample; and identifying said bacterium that are overlaid with a positive SHS signal as Gram-negative and those that are not overlaid with a positive SHS signal as Gram-positive. In one embodiment, said identifying step further comprises: processing said optical image and said SHS image with an unbiased automated image-based analysis algorithm.

BRIEF DESCRIPTION OF THE DRAWINGS

The following detailed description of embodiments of the invention will be better understood when read in conjunction with the appended drawings. It should be understood that the invention is not limited to the precise arrangements and instrumentalities of the embodiments shown in the drawings.

FIGS. 1A and 1B, depicts a schematic diagram representing a cross-section of the general cell wall ultrastructure of Gram-positive (FIG. 1A) and Gram-negative (FIG. 1B) bacteria. The outer membrane of the Gram-negative cells are coated with LPS hairs and perforated with water-filled Omp channels that permit passive diffusion across the OM.

FIGS. 2A and 2B, depict exemplary results of time-resolved second-harmonic scattering (SHS) of Gram-negative bacteria. FIG. 2A depicts a schematic diagram of the setup of the circulating liquid flow jet/SHS experiment. FIG. 2B depicts results of the measured time-resolved SHS response of malachite green (MG; green) and CV (purple) interacting with *E. coli*. Black arrows highlight the delay between the onsets of the secondary rise of SHS signal.

FIGS. 3A and 3B, depict exemplary and expected results of MG and CV transport kinetics, respectively, in Gram-negative and Gram-positive bacteria. FIG. 3A depicts results demonstrating representative time-resolved SHS signal following addition of bacteria (pink circles, *E. coli* and violet circles, *L. rhamnosus*) to solutions containing 10 µM malachite green (MG). Bacteria were added to the system around t=9 s. Dashed lines are best fit results based upon a kinetic model of molecular uptake. FIG. 3B depicts simulated results of the time-resolved SHS signal following addition of bacteria (pink line, *E. coli* and violet line, *L. rhamnosus*) in the presence of Crystal Violet (CV).

FIGS. 5A and 5B, depicts exemplary results demonstrating the kinetics of MG transport in single cells of Gram-negative bacteria.

FIG. 5A depicts representative time-resolved SHS images of MG interacting with *E. coli* (mc4100). FIG. 5B depicts exemplary results of time-resolved SHS signal of MG interacting with individual *E. coli*, as shown in FIG. 5A.

DETAILED DESCRIPTION

Figure 1:
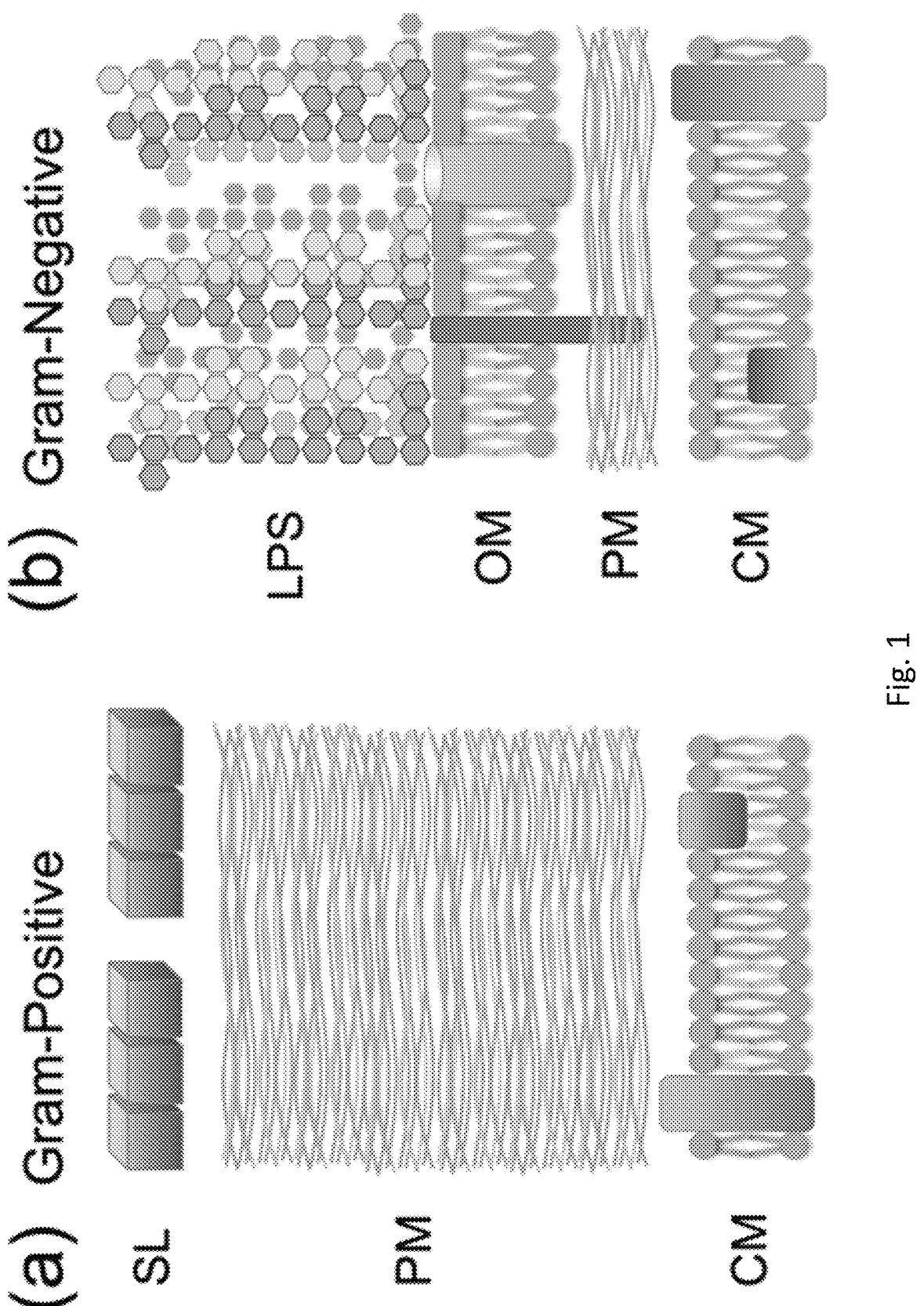
FIG. 1, comprising

In one aspect, the present invention relates to improved methods for differentiating between Gram-negative and Gram-positive bacteria. In one embodiment, non-linear optical techniques are used in the present method to determine the cell wall complex composition of a bacterial specimen via transport of a small molecule. In one embodiment, the small molecule is crystal violet. In one embodiment, said determination of said bacterial cell wall complex composition designates said bacteria as either Gram-negative or Gram-positive.

Definitions

Unless defined otherwise, all technical and scientific terms used herein have the same meaning as commonly understood by one of ordinary skill in the art to which this invention belongs.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

As used herein, a "bacterial specimen" comprises any sample, whether biological or inorganic in nature, that contains or is suspected to contain one or more bacterium.

Herein, the terms "fundamental light" and "fundamental beam" are used interchangeably to refer to an incident source of electromagnetic radiation in the visible spectrum. For example, a non-symmetric molecule illuminated with 800 nm wavelength fundamental light will scatter second-harmonic light at 400 nm.

As used herein "Gram-stain" refers to any method of determining the Gram classification of one or more bacterium. "Gram classification", as used herein, refers to the classification of bacteria based upon cell wall composition.

For example, Gram-negative bacteria have a relatively thin peptidoglycan mesh (PM) in between a pair of phospholipoprotein membranes, while Gram-positive bacteria have a much thicker PM that surrounds a single phospholipoprotein membrane.

Herein the terms "nonlinear-active", "SH-active" and "non-symmetric" are used interchangeably to refer to a molecule or material phase that is not centrosymmetric. A molecule is centrosymmetric only if there exists a point in space, called the 'center' or 'inversion center,' through which an inversion $(x,y,z) \rightarrow (-x, -y, -z)$ of all atoms can be performed that leaves the molecule or material unchanged.

As used herein, a "response", as it relates to a second-harmonic scattering signal, refers to the ratio of the baseline signal (corresponding to incoherent hyper-Rayleigh scattering from the solution of molecule alone) and the plateau signal (the plateau of the signal that occurs after the initial rapid spike in signal following addition of bacteria to the small molecule solution). A "positive response" refers to a ratio less than 1 (i.e. a baseline signal that is less than the plateau signal). A "negative response" refers to a ratio greater than 1 (i.e. a baseline signal that is greater than the plateau signal).

As used herein, a "second-harmonic scattering (SHS) signal" refers to second-harmonic light scattered by a non-symmetric molecule and absorbed by a suitable detector. In reference to image-based methods and analysis, a "positive SHS signal" refers to a detectable integrated image intensity that is greater than the background intensity.

As used herein in reference to cells, the term "taken up" refers to the active or passive transport and separation of a molecular species from extracellular bulk solution to a discrete cellular compartment. For example, a molecule is taken up by a Gram-positive bacterium if it is transported across the outer surface layer and adsorbed into the peptidoglycan mesh, regardless of whether it passes through the cytoplasmic membrane.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

The present invention is based, in part, on the discovery that crystal violet (CV) exhibits markedly different transport kinetics in Gram-negative and Gram-positive bacteria as measured by time-resolved non-linear optical techniques. The present invention is also based, in part, on the long felt but currently unmet need for simpler and more reliable methods for Gram classification of live bacteria.

Nonlinear Optical Techniques

In one embodiment, the present invention comprises a method of determining bacterial cell wall composition using nonlinear optical techniques. In one embodiment, the present invention comprises a method of differentiating between Gram-negative and Gram-positive bacteria using nonlinear optical techniques. In one embodiment, the present invention comprises an automated method of differentiating between Gram-negative and Gram-positive bacteria using nonlinear optical techniques. In one embodiment, said nonlinear optical technique is second harmonic scattering (SHS).

Nonlinear optical light is any light that results from a nonlinear transformation of light beams at one or more fundamental frequencies (also referred to herein as fundamental beam(s)). A nonlinear optical technique is capable of transforming the physical properties, such as frequency, intensity, etc., of one or more incident light beams, called the fundamental beams. The nonlinear beams emanating from the sample are the higher order frequency beams, e.g. second or third harmonic, etc., or the beams at the sum or difference frequencies. For example, in second harmonic generation (SHG), two photons of the fundamental beam are virtually scattered by the sample to produce one photon of the second harmonic. A nonlinear optical technique is also referred to herein as a surface-selective nonlinear optical technique.

Second harmonic generation (SHG) and other surface-selective nonlinear optical techniques are directly related to the orientation of the nonlinear-active species in a sample, because the fundamental and nonlinear beams have well-defined phase relationships, and the wavefronts of the non-linear beam in a macroscopic sample (within the coherence length) are in phase. Any change in the orientation of the nonlinear-active species can be detected by measuring one or more physical properties of the nonlinear optical beam emanating from the sample. These coherency properties of the nonlinear optical technique offer a number of advantages useful for surface or high-throughput studies in which, for example, either a single surface or a microarray surface is examined. The coherent nature of the nonlinear optical beam emanating from the sample also allows discrimination among more than one nonlinear optical beam emanating from a sample. An apparatus using nonlinear optical surface-selective-based detection, such as with second harmonic generation, requires minimal collection optics since generation of the nonlinear light only occurs at the interface (in the absence of an applied field) and thus, in principle, allows extremely high depth discrimination and fast scanning.

SH scattering (SHS) is based on the nonlinear optical phenomenon, second harmonic generation (SHG), and consists of the selective detection of angular components of coherent SH light from nonflat objects of a finite dimension. Just like SHG, SH scattering involves conversion of the frequency of an incident light from w to 2ω after interacting with matter lacking inversion symmetry (Eisenthal, K. B., 2006, *Chem. Rev.* 106: 1462-1477; Gonella, G., et al., 2014, *Langmuir.* 30: 2588-2599). Such matter exhibits nonlinear polarizability and is hereafter denoted SH-active or nonlinear-active.

In one embodiment of the present invention, the method comprises measuring a SHS signal. In one embodiment, said measuring of said SHS signal comprises: exposing a sample to a fundamental light source; and detecting the second-harmonic wavelength of said light. In one embodiment, said sample is a solution containing a small molecule. In one embodiment, said solution does not contain bacteria. In one embodiment, said sample is a suspension of bacteria in a solution of a small molecule. In one embodiment, said sample is a mixed population of one or more bacterium. In one embodiment, said sample is a sample that is suspected to contain one or more bacterium.

It should be appreciated by those in the art that any known suitable source of fundamental light can be used in the methods of the present invention. In one embodiment of the present invention, said fundamental light source has a wavelength between 200-1400 nm. In one embodiment, said fundamental light source has a wavelength between 400-1200 nm. In one embodiment, said fundamental light source has a wavelength between 600-1000 nm. In one embodiment, said fundamental light source has a wavelength between 700-900 nm. In one embodiment, said fundamental light source has a wavelength between 750-850 nm. In one embodiment, said fundamental light source has a wavelength of about 800 nm. In one embodiment, said fundamental light source has a wavelength of 800 nm. In one embodiment, said fundamental light source is a titanium-sapphire laser. In one embodiment, said titanium-sapphire laser is Coherent Micra V. In one embodiment, said titanium-sapphire laser has the following experimental parameters: oscillator only, 50 fs pulse duration, 4 nJ pulse energy, 76 MHz repetition rate, and 0.4 W average power. In one embodiment, the diffraction limited focused beam of said titanium-sapphire laser is raster scanned (using a pair of galvonometer scanning mirrors) over the field of view of the sample.

In one embodiment of the present invention, said second-harmonic wavelength of light is passed through a band-pass filter and monochromator. In one embodiment, said band-pass filter and monochromator excludes scattered light of the fundamental wavelength. In one embodiment, said band-pass filter and monochromator allow 400±399 nm light to reach the detector. In one embodiment, said band-pass filter and monochromator allow 400±200 nm light to reach the detector. In one embodiment, said band-pass filter and monochromator allow 400±100 nm light to reach the detector. In one embodiment, said band-pass filter and monochromator allow 400±10 nm light to reach the detector. In one embodiment, said band-pass filter and monochromator allow 400±1 nm light to reach the detector.

It should be appreciated by those of skill in the art that any methods suitable for photodetection can be used to measure scattered light according to the methods of the present invention. In one embodiment of the present invention, said second-harmonic wavelength of light is detected by a photomultiplier, amplified, and processed through a correlated photon counting system. In one embodiment, said second-harmonic wavelength of light is collected using a single element, non-descanned detection (NDD) photomultiplier tube detector. In one embodiment, said collected signal is used to generate an image. A photomultiplier is a device that converts incident photons into an electrical signal. Photomultipliers are useful for light detection of very weak signals and are photoemissive devices in which the absorption of a photon results in the emission of an electron. These detectors work by amplifying the electrons generated by a photocathode exposed to a photon flux. The principle of a correlated photon counting system is the detection of single photons and the measurement of their arrival times in respect to a reference signal, usually the light source.

In one embodiment of the present invention, the method comprises measuring a baseline SHS signal. In one embodiment, said baseline SHS signal is derived from said solution containing a small molecule. In one embodiment, said baseline SHS signal is measured for at least 1 second. In one embodiment, said baseline SHS signal is measured for at least 5 seconds. In one embodiment, said baseline SHS signal is measured for at least 10 seconds. In one embodiment, said baseline SHS signal is measured for at least 100 seconds. In one embodiment, said baseline SHS signal is measured for between 1-1000 seconds. In one embodiment, said baseline SHS signal is measured for between 5-100 seconds. In one embodiment, said baseline SHS signal is measured for about 10 seconds. In one embodiment, said baseline SHS signal is measured for 10 seconds.

In one embodiment of the present invention, the method comprises measuring a response SHS signal. In one embodiment, said response signal is derived from said suspension of bacteria in a solution of a small molecule. In one embodiment, said response SHS signal is measured for at least 1 second. In one embodiment, said response SHS signal is measured for at least 100 seconds. In one embodiment, said response SHS signal is measured for at least 1000 seconds. In one embodiment, said response SHS signal is measured for between 10-5000 seconds. In one embodiment, said response SHS signal is measured for between 100-1000 seconds. In one embodiment, said response SHS signal is measured for about 100 seconds. In one embodiment, said response SHS signal is measured for 100 seconds. In one embodiment, said response SHS signal is measured for about 1000 seconds. In one embodiment, said response SHS signal is measured for 1000 seconds.

A common equation used to model orientation dependence of nonlinear-active species at an interface is:

$$\chi^{(2)}=N_S<\alpha^{(2)}>$$

where $\chi^{(2)}$ is the nonlinear susceptiblity, $N_S$ is the total number of molecules per unit area at the interface and $<\alpha^{(2)}>$ is the average over the orientational distribution of the nonlinear hyperpolarizabilities—$\alpha^{(2)}$—in these molecules. Typical equations describing the nonlinear interaction for second harmonic generation are: $\alpha^{(2)}(2\omega)=\beta E(\omega)\cdot E(\omega)$ or $P^{(2)}(2\omega)=\chi^{(2)}{:}E(\omega)E(\omega)$ where $\alpha$ and P are, respectively, the induced molecular and macroscopic dipoles oscillating at frequency $2\omega$, $\beta$ and $\chi^{(2)}$ are, respectively, the hyperpolarizability and second-harmonic (nonlinear) susceptibility tensors, and $E(\omega)$ is the electric field component of the incident radiation oscillating at frequency co. The macroscopic nonlinear susceptibility $\chi^{(2)}$ is related by an orientational average of the microscopic hyperpolarizability. The next order term in the expansion of the induced macroscopic dipole describes other nonlinear phenomenon, such as third harmonic generation. The third order term is responsible for such nonlinear phenomena as two-photon fluorescence. For sum or difference frequency generation, the driving electric fields (fundamentals) oscillate at different frequencies (i.e., $\omega 1$ and $\omega 2$) and the nonlinear radiation oscillates at the sum or difference frequency ($\omega 1 \pm \omega 2$).

The intensity of SHG is proportional to the square of the nonlinear susceptibility and is dependent on the amount of oriented nonlinear-active species in a sample, and thus to changes in this orientation, both at an interface and species aligned in the bulk (the latter through an electric field-poled mechanism, for example). This property can be exploited to detect a conformational change. For example, conformational change in receptors can be detected using a nonlinear-active label or moiety wherein the label is attached to or associated with the receptor; a conformational change leads to a change in the direction (orientation) of the label with respect to the surface plane (or applied field direction) and thus to a change in a physical property of the nonlinear optical signal. The techniques are intrinsically sensitive to these changes at an interface and can be made sensitive to them in the bulk as well, by applying an electric field to pole molecules or simply by detecting that fraction of the ensemble which produce hyper-Rayleigh scattering (HRS) due to fluctuational changes in their number density or orientation as is well known to one skilled in the art.

In hyper-Rayleigh scattering (HRS), the fluctuations of nonlinear-active molecules lead to instantaneous departures from centrosymmetry, and thus allow for a low amount of second-harmonic emission to occur, although this emission is incoherent. Because the fluctuations depend on molecular size, among other properties, HRS can be used to discriminate an unbound molecule in solution from the same molecule bound to one or more binding partners. Thermal energy drives the fluctuations required for HRS, however, an external force can also be applied to induce or amplify the fluctuations, thus increasing the HRS signal. For example, a flow-field can be used to transiently orient molecules in solution by injecting a burst or stream of fluid into it. Pulsed and alternating electric fields applied to the sample can also increase the FIRS signal.

In some embodiments, one or more step of the methods of the present invention are automated. It should be recognized by those in the art that any number of known automated sample processing methods can be used with the present invention. It should also be recognized by those in the art that any number of known automated analyses or signal processing algorithms may be used with the methods of the present invention. In one embodiment, the detector for the SH light can be coupled with a signal processing algorithm in order to characterize the recorded SH scattering time-traces and make an unbiased assessment to categorize the sample as either Gram-positive or Gram-negative. In one embodiment, said algorithm characterizes a bacterium as Gram-negative if the response SHS signal is above the baseline signal, and Gram-positive if the response SHS signal is below the baseline signal. In one embodiment, said signal processing algorithm includes an image based analysis. In one embodiment, said image based analysis determines which optically imaged cells also exhibit a positive SHS signal greater than 100 seconds after addition of CV (long-term SHS signal). In one embodiment, said image based analysis characterizes optically imaged cells that do exhibit a long-term SHS signal as Gram-negative, while those optically imaged cells that do not exhibit a long-term SHS signal are characterized as Gram-positive.

Non-Random Orientations and Nonlinear Activity

In one embodiment, the present invention comprises an improved method of determining bacterial cell wall composition using a small molecule. In one embodiment, the present invention comprises an improved method of differentiating between Gram-negative and Gram-positive bacteria using a small molecule. In one embodiment, said small molecule is nonlinear-active or non-symmetric. In one embodiment, said nonlinear-active or non-symmetric small molecule comprises a non-symmetric dye. In one embodiment, said non-symmetric dye is crystal violet.

A non-random orientation is a necessary condition for generation of the surface-selective nonlinear optical signal. Only the non-centrosymmetric region of a system is capable of generating non-linear light. A molecule or material phase is centrosymmetric if there exists a point in space, called the 'center' or 'inversion center,' through which an inversion $(x,y,z){\rightarrow}(-x, -y, -z)$ of all atoms can be performed that leaves the molecule or material unchanged. For example, if the molecule is of uniform composition and spherical in shape, it is centrosymmetric. Centrosymmetric molecules or materials have no nonlinear susceptibility or hyperpolarizability, necessary for second or higher harmonic, sum frequency and difference frequency generation. A non-centrosymmetric molecule or material lacks this center of inversion, and therefore can be nonlinear-active. Non-centrosymmetric regions can be at surfaces, e.g. arrays, substrates, etc., or in bulk phase, e.g. solutions.

Gram-Stain Method

In one embodiment, the present invention comprises an improved method of determining bacterial cell wall composition. In one embodiment, the invention comprises an improved method of differentiating between Gram-negative and Gram-positive bacteria.

The Gram stain is a classic biological protocol that is still actively used to differentiate bacteria into two possible classifications: Gram-positive (Gram+) cells, in which the stain is retained, and Gram-negative (Gram−) cells, in which the stain is lost. The bacterial response to the Gram-stain method, however, is not uniform, as some bacteria exhibit so-called Gram-variability in which cells of seemingly identical composition yield a mixed stain response. Nevertheless, concerted experimental efforts have deduced that Gram+ and Gram− bacteria differ principally in their cellular ultrastructure. Specifically, Gram− cells are composed of a pair of distinct lipoprotein membranes: a lipopolysaccharide (LPS) coated outer membrane (OM) and an inner cytoplasmic membrane (CM), which are separated by a peptidoglycan mesh (PM) that is bound to the OM through a series of peptidoglycan-associated lipoproteins (PaL). Conversely, Gram+ cells are comparatively simpler and possess only a single lipoprotein membrane (i.e., the CM), though their PM is typically ca. 10-20+ times thicker than that found in Gram− cells.

Exemplary Gram-positive bacteria include, but are not limited to: Actinobacteria, *Enterococcus, Actinomyces*, Lactobacillales, *Actinomyces israelii, Listeria, Bacillales, Nocardia, Bacillus, Nocardia* asteroids, *Clostridium, Nocardia brasiliensis, Clostridium acetobutylicum, Propionibacterium acnes, Clostridium aerotolerans, Rhodococcus equi, Clostridium argentinense*, Sarcina, *Clostridium baratii, Solobacterium moorei, Clostridium beijerinckii, Staphylococcus, Clostridium bifermentans, Staphylococcus aureus, Clostridium botulinum, Staphylococcus capitis, Clostridium butyricum, Staphylococcus caprae, Clostridium cadaveris, Staphylococcus epidermidis, Clostridium cellulolyticum, Staphylococcus haemolyticus, Clostridium chauvoei, Staphylococcus hominis, Clostridium clostridioforme, Staphylococcus lugdunensis, Clostridium colicanis, Staphylococcus Muscae Clostridium difficile, Staphylococcus nepalensis, Clostridium estertheticum, Staphylococcus pettenkoferi, Clostridium fallax, Staphylococcus saprophyticus, Clostridium formicaceticum, Staphylococcus succinus, Clostridium histolyticum, Staphylococcus warneri, Clostridium innocuum, Staphylococcus xylosus, Clostridium kluyveri*, Strangles, *Clostridium ljungdahlii, Streptococcus, Clostridium novyi, Streptococcus agalactiae, Clostridium paraputrificum, Streptococcus anginosus, Clostridium perfringens, Streptococcus bovis, Clostridium phytofermentans, Streptococcus canis, Clostridium piliforme, Streptococcus iniae, Clostridium ragsdalei, Streptococcus lactarius, Clostridium ramosum, Streptococcus mitis, Clostridium septicum, Streptococcus mutans, Clostridium sordellii, Streptococcus oralis, Clostridium sporogenes, Streptococcus parasanguinis, Clostridium sticklandii, Streptococcus peroris, Clostridium tertium, Streptococcus pneumoniae, Clostridium tetani, Streptococcus pyogenes, Clostridium thermosaccharolyticum, Streptococcus ratti, Clostridium tyrobutyricum, Streptococcus salivarius, Corynebacterium, Streptococcus sanguinis, Corynebacterium bovis, Streptococcus sobrinus, Corynebacterium diphtheriae, Streptococcus suis, Corynebacterium granulosum, Streptococcus salivarius thermophilus, Corynebacterium jeikeium, Streptococcus uberis, Corynebacterium minutissimum, Streptococcus vestibularis, Corynebacterium renale*, and *Streptococcus viridans*.

Exemplary Gram-negative bacteria include, but are not limited to: Acetic acid bacteria, *Fusobacterium necrophorum, Acinetobacter baumannii, Fusobacterium nucleatum, Agrobacterium tumefaciens, Fusobacterium polymorphum, Anaerobiospirillum, Haemophilus haemolyticus, Bacteroides, Haemophilus influenzae, Bacteroides fragilis, Helicobacter, Bdellovibrio, Helicobacter pylori, Brachyspira, Klebsiella pneumoniae, Cardiobacterium hominis, Legionella, Coxiella burnetii, Legionella pneumophila, Cyanobacteria, Leptotrichia buccalis, Cytophaga, Megamonas, Dialister, Megasphaera, Enterobacter, Moraxella, Enterobacter cloacae, Moraxella bovis, Enterobacteriaceae, Moraxella catarrhalis, Escherichia, Moraxella osloensis, Escherichia coli, Morganella morganii, Pseudomonas geniculate, Negativicutes, Rickettsia rickettsii, Neisseria gonorrhoeae, Salmonella, Neisseria meningitidis, Salmonella enterica, Neisseria sicca, Pectinatus, Selenomonadales, Propionispora, Serratia marcescens, Proteobacteria, Shigella, Proteus mirabilis, Spirochaetes, Proteus penneri, Spirochaetaceae, Pseudomonas, Sporomusa, Pseudomonas aeruginosa, Stenotrophomonas, Streptococcus gordonii, Vampirococcus, Verminephrobacter, Vibrio cholerae, Wolbachia*, and *Zymophilus*.

In one embodiment of the present invention, the method comprises contacting a solution containing a small molecule with a suspension of bacteria. In one embodiment, the small molecule is a non-symmetric dye. In one embodiment, the non-symmetric dye is crystal violet. In one embodiment, the concentration of crystal violet in said solution is at least 35 µM. In one embodiment, the concentration of crystal violet in said solution is between 1-100 µM. In one embodiment, the concentration of crystal violet in said solution is between 10-90 µM. In one embodiment, the concentration of crystal violet in said solution is between 20-70 µM. In one embodiment, the concentration of crystal violet in said solution is between 40-60 µM. In one embodiment, the concentration of crystal violet in said solution is about 50 µM. In one embodiment, the concentration of crystal violet in said solution is 50 µM.

Bacterial Culture

In one embodiment, the present invention comprises an improved Gram-stain method to more efficiently and accurately determine bacterial cell wall composition. In one embodiment, the method comprises an improved Gram-stain method to more efficiently and accurately differentiate between Gram+ and Gram-bacteria.

In one embodiment of the present invention, the bacterial specimen is derived from a sample. Samples of particular interest from human or animal sources include mucus-containing samples, such as nasal samples (from, e.g., anterial nares, nasopharyngeal cavity, nasal cavities, anterior nasal vestibule, etc.), as well as samples from the outer ear, middle ear, mouth, rectum, vagina, or other similar tissue. Examples of specific musosal tissues include buccal, gingival, nasal, ocular, tracheal, bronchial, gastrointestinal, rectal, urethral, ureteral, vaginal, cervical, and uterine mucosal membranes. Besides physiological fluids, other test samples may include other liquids as well as solid(s) dissolved in a liquid medium. Samples of interest may include process streams, water, soil, plants or other vegetation, air, surfaces (e.g., contaminated surfaces), and the like. Samples can also include cultured cells. Samples can also include samples on or in a device comprising cells, spores, or enzymes (e.g., a biological indicator device). Suitable samples for methods of the present disclosure can include certain solid samples. Solid samples may be disintegrated (e.g., by blending, sonication, homogenization) and may be suspended in a liquid (e.g., water, buffer, broth). In some embodiments, a sample-collection device (e.g., a swab, a sponge) containing sample material may be used in the method. Alternatively, the sample material may be eluted (e.g., rinsed, scraped, expressed) from the sample-collection device before using the sample material in the method. In some embodiments, liquid or solid samples may be diluted in a liquid (e.g., water, buffer, broth).

It should be appreciated by those of skill in the art that any known methods of bacterial culture and selection can be used with methods of the present invention. In one embodiment, bacteria are cultured prior to determining their Gram classification. In one embodiment, bacteria are first cultured on agar plates. In one embodiment, said agar plates comprise Luria Broth agar (Sigma-Aldrich). In one embodiment, discrete colonies of said bacteria cultured said agar plates are selected for further culturing. In one embodiment, said discrete bacterial colonies are cultured to late-log/early stationary phase in a suitable medium under suitable conditions. In one embodiment, said suitable medium is Terrific Broth (Sigma-Aldrich). In one embodiment, said suitable conditions comprise shaking at a constant temperature. In one embodiment, said shaking occurs at between 10-500 rpm. In one embodiment, said shaking occurs at between 50-250 rpm. In one embodiment, said shaking occurs at between 100-200 rpm. In one embodiment, said shaking occurs at about 150 rpm. In one embodiment, said shaking occurs at 150 rpm. In one embodiment, said temperature is between 34-40° C. In one embodiment, said temperature is between 35-39° C. In one embodiment, said temperature is between 36-38° C. In one embodiment, said temperature is about 37° C. In one embodiment, said temperature is 37° C.

In one embodiment of the present invention, whether said discrete bacterial colonies are cultured to late-log/early stationary phase is determined by measuring the optical density of the bacterial suspension at 600 nm ($OD_{600}$). In one embodiment, said cultured discrete bacterial colonies are centrifuged to pellet, resuspended in a suitable solution for measuring, and diluted to a desired $OD_{600}$. In one embodiment, said cultured discrete bacterial colonies are centrifuged at between 200-5000×g. In one embodiment, said cultured discrete bacterial colonies are centrifuged at between 500-2500×g. In one embodiment, said cultured discrete bacterial colonies are centrifuged at between 1000-2000×g. In one embodiment, said cultured discrete bacterial colonies are centrifuged at about 1500×g. In one embodiment, said cultured discrete bacterial colonies are centrifuged for between 30 seconds to 5 minutes. In one embodiment, said cultured discrete bacterial colonies are centrifuged for between 1-5 minutes. In one embodiment, said cultured discrete bacterial colonies are centrifuged for between 1.5-2.5 minutes. In one embodiment, said cultured discrete bacterial colonies are centrifuged for about 2 minutes. In one embodiment, said cultured discrete bacterial colonies are centrifuged at about 1500×g for 2 minutes. In one embodiment, said suitable solution for measuring comprises a buffer. In one embodiment, said buffer maintains a physiological pH. In one embodiment, said buffer comprises phosphate buffered saline (PB S). In one embodiment, said physiological pH is about 7.4. In one embodiment, said cultured discrete bacterial colonies are diluted to an $OD_{600}$ between 0.1-1. In one embodiment, said cultured discrete bacterial colonies are diluted to an $OD_{600}$ between 0.15-0.75. In one embodiment, said cultured discrete bacterial colonies are diluted to an $OD_{600}$ between 0.2-0.5. In one embodiment, said cultured discrete bacterial colonies are diluted to an $OD_{600}$ of about 0.25. In one embodiment, said cultured discrete bacterial colonies are diluted to an $OD_{600}$ of 0.25.

Examples of bacteria that can be cultured and detected with the disclosed improved Gram-staining methods, include without limitation: *Acinetobacter baumanii*, *Actinobacillus* sp., Actinomycetes, *Actinomyces* sp. (such as *Actinomyces israelii* and *Actinomyces naeslundii*), *Aeromonas* sp. (such as *Aeromonas hydrophila*, *Aeromonas veronii* biovar *sobria* (*Aeromonas sobria*), and *Aeromonas caviae*), *Anaplasma phagocytophilum*, *Alcaligenes xylosoxidans*, *Acinetobacter baumanii*, *Actinobacillus actinomycetemcomitans*, *Bacillus* sp. (such as *Bacillus anthracis*, *Bacillus cereus*, *Bacillus subtilis*, *Bacillus thuringiensis*, and *Bacillus stearothermophilus*), *Bacteroides* sp. (such as *Bacteroides fragilis*), *Bartonella* sp. (such as *Bartonella bacilliformis* and *Bartonella henselae*, *Bifidobacterium* sp., *Bordetella* sp. (such as *Bordetella pertussis*, *Bordetella parapertussis*, and *Bordetella bronchiseptica*), *Borrelia* sp. (such as *Borrelia recurrentis*, and *Borrelia burgdorferi*), *Brucella* sp. (such as *Brucella abortus*, *Brucella canis*, *Brucella melintensis* and *Brucella suis*), *Burkholderia* sp. (such as *Burkholderia pseudomallei* and *Burkholderia cepacia*), *Campylobacter* sp. (such as *Campylobacter jejuni*, *Campylobacter coli*, *Campylobacter lari* and *Campylobacter fetus*), *Capnocytophaga* sp., *Cardiobacterium hominis*, *Chlamydia trachomatis*, *Chlamydophila pneumoniae*, *Chlamydophila psittaci*, *Citrobacter* sp., *Coxiella burnetii*, *Corynebacterium* sp. (such as, *Corynebacterium diphtheriae*, *Corynebacterium jeikeum* and *Corynebacterium*), *Clostridium* sp. (such as *Clostridium perfringens*, *Clostridium difficile*, *Clostridium botulinum* and *Clostridium tetani*), *Eikenella corrodens*, *Enterobacter* sp. (such as *Enterobacter* aero genes, *Enterobacter agglomerans*, *Enterobacter cloacae* and *Escherichia coli*, including opportunistic *Escherichia coli*, such as enterotoxigenic *E. coli*, enteroinvasive *E. coli*, enteropathogenic *E. coli*, entero hemorrhagic *E. coli*, enteroaggregative *E. coli* and uropathogenic *E. coli*) *Enterococcus* sp. (such as *Enterococcus faecalis* and *Enterococcus faecium*) *Ehrlichia* sp. (such as *Ehrlichia chafeensia* and *Ehrlichia canis*), *Erysipelothrix rhusiopathiae*, *Eubacterium* sp., *Francisella tularensis*, *Fusobacterium nucleatum*, *Gardnerella vaginalis*, *Gemella morbillorum*, *Haemophilus* sp. (such as *Haemophilus influenzae*, *Haemophilus ducreyi*, *Haemophilus aegyptius*, *Haemophilus parainfluenzae*, *Haemophilus haemolyticus* and *Haemophilus parahaemolyticus*, *Helicobacter* sp. (such as *Helicobacter pylori*, *Helicobacter cinaedi* and *Helicobacter fennelliae*), *Kingella kingii*, *Klebsiella* sp. (such as *Klebsiella pneumoniae*, *Klebsiella granulomatis* and *Klebsiella oxytoca*), *Lactobacillus* sp., *Listeria* monocyto genes, *Leptospira interrogans*, *Legionella pneumophila*, *Leptospira interrogans*, *Peptostreptococcus* sp., *Moraxella catarrhalis*, *Morganella* sp., *Mobiluncus* sp., *Micrococcus* sp., *Mycobacterium* sp. (such as *Mycobacterium leprae*, *Mycobacterium tuberculosis*, *Mycobacterium intracellulare*, *Mycobacterium avium*, *Mycobacterium bovis*, and *Mycobacterium marinum*), *Mycoplasm* sp. (such as *Mycoplasma pneumoniae*, *Mycoplasma hominis*, and *Mycoplasma genitalium*), *Nocardia* sp. (such as *Nocardia asteroides*, *Nocardia cyriacigeorgica* and *Nocardia brasiliensis*), *Neisseria* sp. (such as *Neisseria gonorrhoeae* and *Neisseria meningitidis*), *Pasteurella multocida*, *Plesiomonas shigelloides*. *Prevotella* sp., *Porphyromonas* sp., *Prevotella melaninogenica*, *Proteus* sp. (such as *Proteus vulgaris* and *Proteus mirabilis*), *Providencia* sp. (such as *Providencia alcalifaciens*, *Providencia rettgeri* and *Providencia stuartii*), *Pseudomonas aeruginosa*, *Propionibacte-*

*rium acnes, Rhodococcus equi, Rickettsia* sp. (such as *Rick-ettsia rickettsii, Rickettsia akari* and *Rickettsia prowazekii, Orientia tsutsugamushi* (formerly: *Rickettsia tsutsug-amushi*) and *Rickettsia typhi*), *Rhodococcus* sp., *Serratia marcescens, Stenotrophomonas maltophilia, Salmonella* sp. (such as *Salmonella enterica, Salmonella typhi, Salmonella paratyphi, Salmonella enteritidis, Salmonella cholerasuis* and *Salmonella typhimurium*), *Serratia* sp. (such as *Serratia marcesans* and *Serratia liquifaciens*), *Shigella* sp. (such as *Shigella dysenteriae, Shigella flexneri, Shigella boydii* and *Shigella sonnei*), *Staphylococcus* sp. (such as *Staphylococ-cus aureus, Staphylococcus epidermidis, Staphylococcus hemolyticus, Staphylococcus saprophyticus*), *Streptococcus* sp. (such as *Streptococcus pneumoniae* (for example chloramphenicol-resistant serotype 4 *Streptococcus pneu-moniae*, spectinomycin-resistant serotype 6B *Streptococcus pneumoniae*, streptomycin-resistant serotype 9V *Streptococ-cus pneumoniae*, erythromycin-resistant serotype 14 *Strep-tococcus pneumoniae*, optochin-resistant serotype 14 *Strep-tococcus pneumoniae*, rifampicin-resistant serotype/8C *Streptococcus pneumoniae*, tetracycline-resistant serotype 19F *Streptococcus pneumoniae*, penicillin-resistant serotype 19F *Streptococcus pneumoniae*, and trimethoprim-resistant serotype 23F *Streptococcus pneumoniae*, chloramphenicol-resistant serotype 4 *Streptococcus pneumoniae*, spectinomy-cin-resistant serotype 6B *Streptococcus pneumoniae*, strep-tomycin-resistant serotype 9V *Streptococcus pneumoniae*, optochin-resistant serotype 14 *Streptococcus pneumoniae*, rifampicin-resistant serotype 18C *Streptococcus pneumo-niae*, penicillin-resistant serotype 19F *Streptococcus pneu-moniae*, or trimethoprim-resistant serotype 23F *Streptococ-cus pneumoniae*), *Streptococcus agalactiae, Streptococcus mutans, Streptococcus pyogenes*, Group A streptococci, *Streptococcus pyogenes*, Group B streptococci, *Streptococ-cus agalactiae*, Group C streptococci, *Streptococcus angi-nosus, Streptococcus equismilis*, Group D streptococci, *Streptococcus bovis*, Group F streptococci, and *Streptococ-cus anginosus* Group G streptococci), Spirillum minus, *Streptobacillus moniliformi, Treponema* sp. (such as *Treponema carateum, Treponema petenue, Treponema pal-lidum* and *Treponema endemicum, Tropheryma whippelii, Ureaplasma urealyticum, Veillonella* sp., *Vibrio* sp. (such as *Vibrio cholerae, Vibrio parahemolyticus, Vibrio vulnificus, Vibrio parahaemolyticus, Vibrio vulnificus, Vibrio algi-nolyticus, Vibrio mimicus, Vibrio hollisae, Vibrio fluvialis, Vibrio metchnikovii, Vibrio damsela* and *Vibrio furnisii*), *Yersinia* sp. (such as *Yersinia enterocolitica, Yersinia pestis*, and *Yersinia pseudotuberculosis*) and *Xanthomonas malto-philia* among others.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore are not to be con-strued as limiting in any way the remainder of the disclosure.

Example 1: Gram-Stain Discrimination of Bacteria Using Time-Resolved Nonlinear Light Scattering In the present Example, the time-resolved SHS signals from cationic CV were examined as it is taken up by representative Gram-positive (*Lactobacillus* (L.) *rhamno-sus*) and Gram-negative (*E. coli*) bacteria. The distinctly different time-dependent SHS signals observed for the two different types of bacteria, which stems from their charac-teristic cell wall ultra-structures (particularly the thickness of their PM), provides the basis for a new SHS based biosensor, capable of Gram-stain discrimination in samples of living bacteria.

The methods of the present Example are now described herein.

Sample Preparation

Discrete colonies of *E. coli* (mc4100 strain) and *L. rhamnosus* (R0011 strain) were grown on Luria Broth agar (Sigma-Aldrich) plates. Experimental samples, prepared from single colonies, were cultured (37° C., 150 rpm shak-ing) in Terrific Broth (TB, Sigma-Aldrich) to late-log/early stationary phase. Samples were lightly pelletized by cen-trifugation (ca. 1500 g for 2 min) and washed in 1×PBS to remove waste and residual TB. Washed pellets were re-suspended in 1×PBS and diluted to an optical density at 600 nm ($OD_{600}$)=0.25.

Concentrated stock solutions of malachite green (MG) and crystal violet (CV) were prepared by dissolution of the oxalate and chloride salt, respectively, used as obtained from the supplier (Sigma-Aldrich). Final sample concentrations were maintained at 10 μM (MG) and 50 μM (CV).

Second-Harmonic Generation Scattering in Colloidal Sus-pensions

Figure 2:
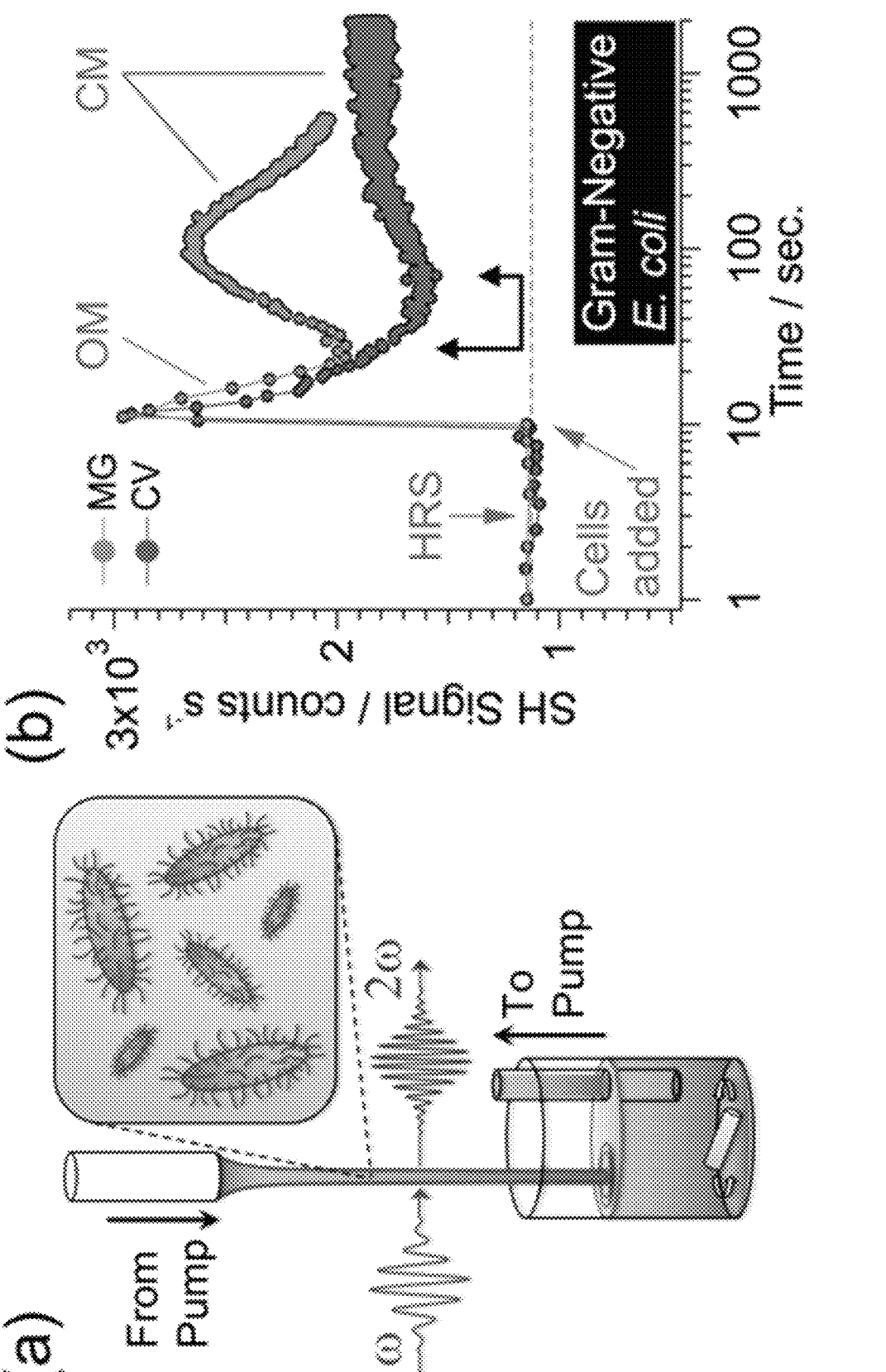
FIG. 2, comprising

The 800 nm output from a Ti:sapphire laser (Coherent, Micra V, oscillator only, 50 fs pulse duration, 4 nJ pulse energy, 76 MHz repetition rate, 0.4 W average power) was used as a fundamental light source. As depicted in FIG. 2A, SHS was measured while the sample circulated through a liquid flow system. To ensure collection of the SH signal solely from the sample, a long-pass filter (Schott, RG695) was placed in front of the focusing lens immediately before the sample jet. Further, as both the fundamental (800 nm) and SH light (400 nm) is scattered from the sample, a BG39 band-pass filter and monochromator (1 mm entrance and exit slits, 400±1 nm bandwidth) were used to selectively collect the SH signal. The signal was then detected by a photomultiplier (Hamamatsu, R585), amplified (Stanford Research Systems, SR440), and processed through a corre-lated photon counting system (Stanford Research Systems, SRS SR400).

As a means of separating the surface specific SH response from the hyper-Rayleigh scattering (HRS) of the bulk dye solution, SHS was first measured from the dye solution in the absence of cells. An aliquot of the concentrated cellular stock solution was then added (around 10 s) into the reser-voir, allowing SHS to be measured as a change to the baseline HRS signal. To ensure rapid mixing of the suspen-sion, in addition to circulating through the system, the contents of the sample reservoir were continuously stirred.

Second-Harmonic Generation (SHG) Imaging of Single Cells

All SHG imaging was performed on an LSM 780 upright multiphoton microscope (ZEISS). The laser source was a Coherent Chameleon Vision 2 mode-locked Ti:Sapphire laser (tunable from 680-1080 nm, average peak power of 3.75 W at 800 nm, pulse width of 140 fs, and a repetition rate of 80 MHz). Experimental parameters were chosen as follows: excitation wavelength of 800 nm, 2% laser power (ca. 9.8 mW at the front objective), W Plan-Apochromat 20× objective lens (NA=1.0), pixel dwell time of 0.79 µs/pixel, image size of 1024×1024 pixels, pixel size of ca. 539 nm, z-scan interval of ca. 3-5 µm (i.e., 3 stacks were scanned in z-axis), and a delay time of 60 seconds between consecutive images. The 400 nm second harmonic (SH) response of MG was recorded in the forward propagation direction using a narrow bandpass filter (400±10 nm), and collected using a water condenser with (NA=1.2). SHG signal was detected using a single element, non-descanned detection (NDD) PMT detector (QE=22%). All data were saved in 16-bit format.

The results of the present Example are now described herein.

As shown in FIG. 2A, the SHS produced from SH active molecules, such as CV and malachite green (MG), interacting with a colloidal suspension of live bacteria in a continuously circulating liquid flow jet system was monitored. Similar to a prior Gram-stain study (M. J. Wilhelm, et al., *ACS Chem. Biol.* 2015, 10: 1711-1717), FIG. 2B depicts time-resolved SHS resulting from the uptake of MG (green trace) and CV (purple trace) by *E. coli*.

Note that the time axis has been plotted on a log scale to simultaneously highlight both fast transport across the OM and slow transport across the CM. As detailed previously, MG is known to cross both the OM and CM of *E. coli* (M. J. Wilhelm, et al., *ACS Chem. Biol.* 2015, 10: 1711-1717; M. J. Wilhelm, et al., *Biochemistry.* 2015, 54: 4427-4430; J. Zeng, et al., *Biophys. J.* 2013, 104: 139-145; M. J. Wilhelm, et al., *Chem. Phys. Lett.* 2014, 605: 158-163; Wilhelm M J, et al., *J. Chem. Phys.,* 2019, 150(10):104705; M. Sharifian Gh., et al., *J. Phys. Chem. Lett.* 2016, 7: 3406-3411; M. Sharifian Gh., et al., *ACS Med. Chem. Lett.* 2018, 9: 569-574; Wilhelm M J, et al., *Biophys.* 1, 2021, 120(12):2461-2470) and therefore provides a contrast to the CV SHS response. As shown in FIG. 2B, prior to the addition of bacteria into the system, the baseline measured signal corresponds to incoherent hyper-Rayleigh scattering (HRS) from the flowing solution of MG, the intensity of which scales linearly with the concentration of MG in the bulk solution. Following addition of *E. coli* into the circulating solution (ca. 10 s), there is an immediate rise of SHS signal corresponding to saturated adsorption of MG onto the outer surface of the OM. Due to the presence of the Omp channels, MG rapidly crosses the OM and begins to adsorb onto the inner surface of the OM, resulting in an equally rapid decay of the SHS signal due to destructive interference from oppositely oriented MG adsorbed on the opposing leaflets of the OM. Later, around 25 s, a second slower rise of SHS signal is observed as MG diffuses across the comparatively thin PM and begins to slowly adsorb onto the outer surface of the CM. Finally, near 120 s, a second decay of the SHS signal is observed as MG slowly crosses the CM and begins to adsorb onto the interior surface of the CM.

Figure 3:
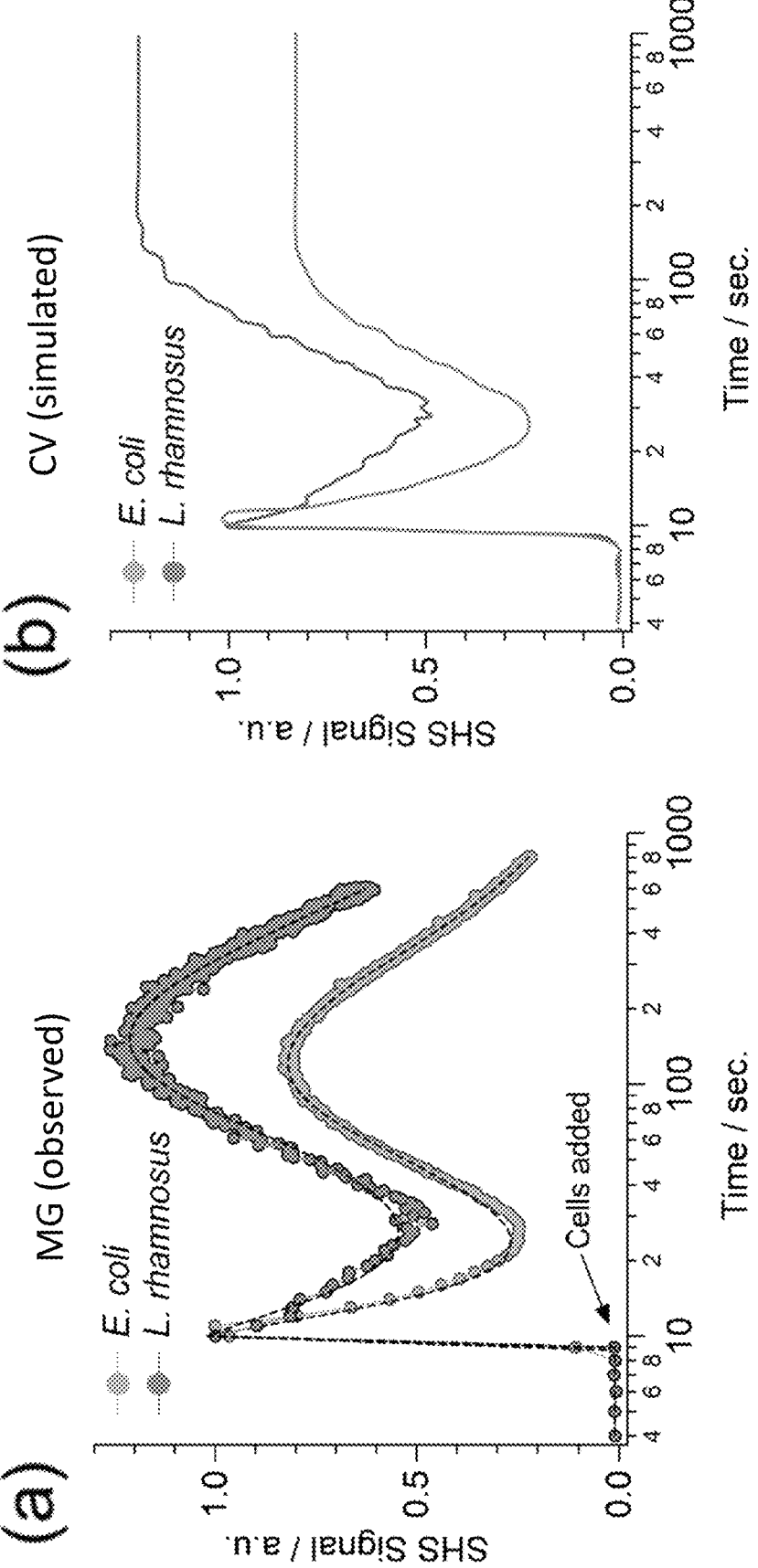
FIG. 3, comprising

Further, despite the numerous structural differences between Gram-negative (*E. coli*) and Gram-positive (*L. rhamnosus*) bacteria, the transport kinetics of MG were observed to be nearly invariant for these two cell types (FIG. 3A). A possible explanation for this behavior is that while the chemical composition of the cell wall components is distinct for Gram-positive vs. Gram-negative cells, their general structures are topologically similar (FIG. 1). For instance, as shown in FIG. 3A, both cell types exhibit an initial rapid transport event through the outermost cellular interface (i.e., the S-layer for Gram-positive and the OM for Gram-negative). While compositionally different, they are both hydrophobic barriers perforated with large (i.e., 2-8 nm wide) water filled channels. From the perspective of a 1 nm wide reporter molecule, both of these interfaces are therefore quite similar. Based upon these results, and given the similar molecular structures of MG and CV, one skilled in the art might reasonably predict qualitatively invariant transport kinetics for CV, which is simulated in FIG. 3B.

Similar to MG, CV rapidly crosses the Omp channels of Gram-negative bacteria, resulting in a nearly identical fast initial rise and decay of SHS signal (FIG. 2B). This is reasonable given the similar molecular structures of MG and CV, as described above, as well as the non-selectivity of the Omp channels in the bacterial OM. However, dissimilar from MG, the decay of SHS signal from CV continues for an additional 50 s (out to roughly 70 s). This is followed by a much slower second rise of the SHS signal, which continues to grow until about 400 s, after which the signal simply exhibits a stable plateau in time. The extended delay prior to the onset of the second rise of SHS signal (FIG. 2B, black arrows) indicates that CV requires additional time to diffuse across the PM before it arrives at the CM, and suggests that CV is interacting strongly with the PM. Notably, Gram-negative bacteria, such as *E. coli*, typically only have a single layer of PM. Consequently, it is anticipated that the roughly 10-times thicker PM found in Gram-positive bacteria should exhibit a correspondingly larger influence on the measured SHS response. Specifically, under similar experimental conditions (i.e., 50 µM CV), the substantially thicker PM of a Gram-positive cell should result in an extended delay period prior to the onset of the second rise of SHS signal, as CV should require more time to diffuse across the PM before arriving at the outer surface of the CM.

Figure 4:
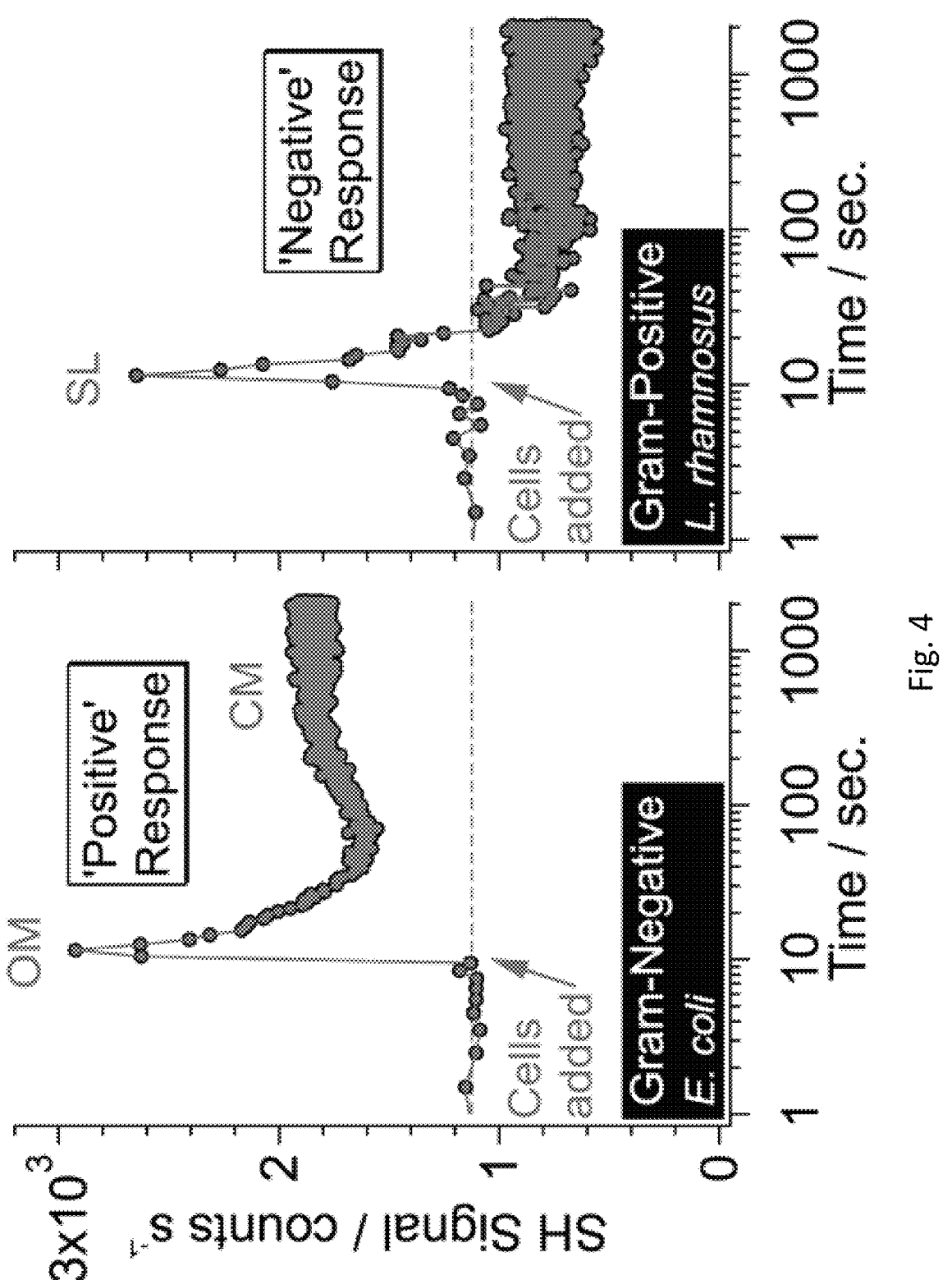
FIG. 4 depicts exemplary results of time-resolved SHS using CV. The time-resolved SHS response for CV uptake in representative Gram-negative bacteria (*E. coli*) is shown on the left and Gram-positive bacteria (*L. rhamnosus*) shown on the right. A measured SHS signal that remains above the nascent hyper-Rayleigh scattering (HRS) baseline is considered a 'positive' response, while an SHS signal that falls below the HRS baseline is considered a 'negative' response.

Indeed, as shown in comparison highlighted in FIG. 4, this anticipation appears to be correct. Specifically, FIG. 4 depicts a side-by-side comparison of the characteristic time-resolved SHS resulting from uptake of CV by representative Gram-negative (*E. coli*, left) and Gram-positive bacteria (*L. rhamnosus*, right). Similar to the Gram-negative CV response, the SHS signal from Gram-positive bacteria exhibits an initial fast transport event (i.e., fast rise and decay of SHS signal), corresponding to rapid diffusion of CV across the outer crystalline protein SL. However, in contrast to the Gram-negative sample, following the fast transport event, the measured SHS of the Gram-positive is observed to decay well below the nascent HRS baseline, and does not recover within the measured observation time (2000+s). Recall that the measured FIRS scales linearly with the concentration of CV in the extracellular solution. Consequently, the observed 30% reduction of the HRS background suggests a removal of ca. 15 µM of CV from the bulk solution. The lost CV presumably is now trapped within the PM of the bacteria. The fact that the measured signal exhibits a one-time drop, rather than a continuous decay over the duration of the experiment, suggests that the available PM is now saturated with CV and in equilibrium with the CV remaining in solution. Notably, repeating the experiment with even higher concentrations did not result in CV adsorption on the outer surface of the CM. In general, within the 2000+s observation time, no second rise of SHS signal is ever observed for Gram-positive cells. This likely stems from the strong interaction between CV and the substantially thicker PM, which prevents CV from ever reaching the bacterial CM.

Despite the lack of a definitive understanding regarding the exact nature of the CV-PM interaction, there are advantages of the striking difference between the measured time-resolved SHS following uptake of CV by Gram-positive and Gram-negative bacteria. As highlighted in FIG. 4, the corresponding designations of positive and negative results (i.e. signal observed vs. signal lost) can be used to differentiate the two Gram-stain categories of bacteria. Specifically, given that the late time SHS signal is dependent upon whether or not CV is able to cross the PM and adsorb onto the outer surface of the CM, Gram-negative cells show signal gain (i.e., elicit a positive response) while Gram-positive cells show a net loss (i.e., negative response) at longer time behaviors. These time-dependent characteristic responses in the SHS signal can be exploited to form the basis of a Gram-stain biosensor using nonlinear optical scattering. As opposed to the classic imaging-based Gram-stain protocol, in which cells are heat fixed and later washed with alcohol (i.e., killed), this flow cell based method can be applied to suspensions of living cells.

Figure 5:
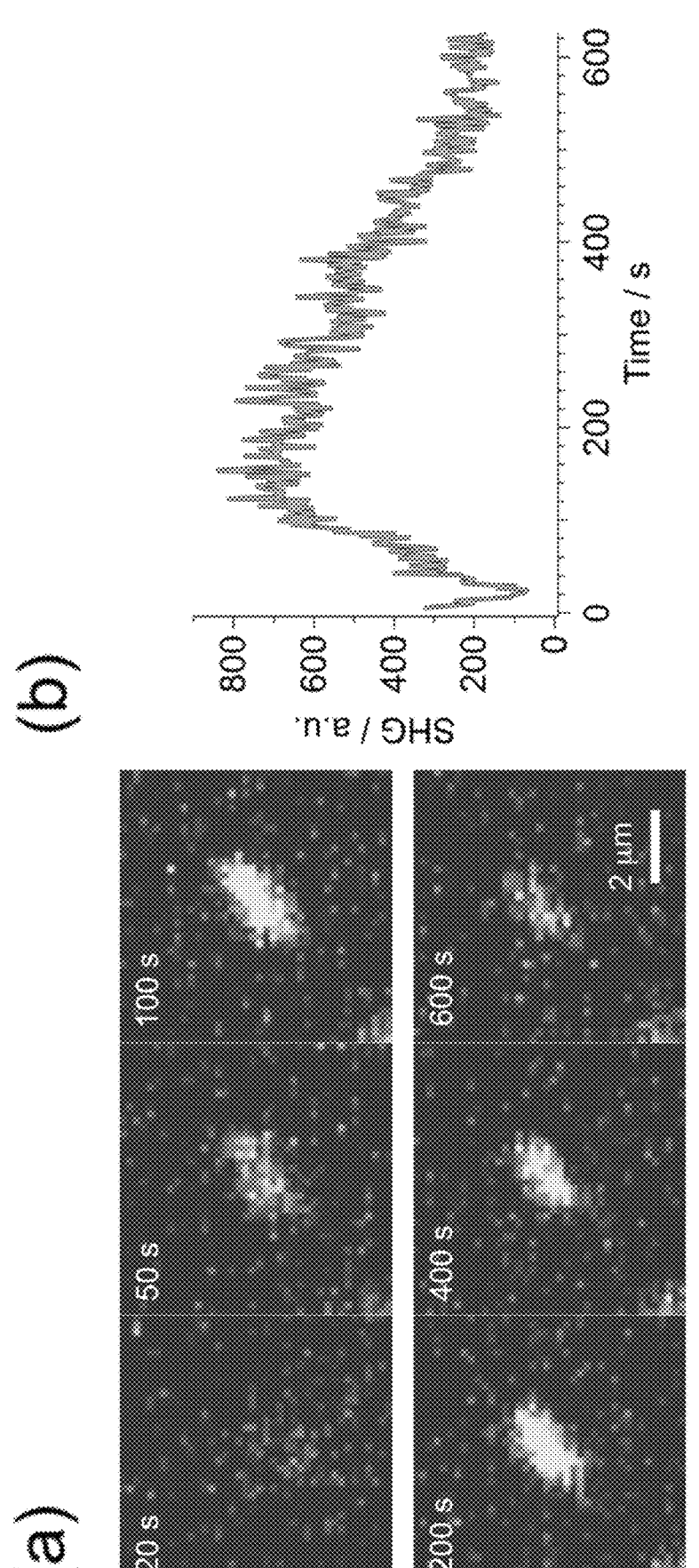
FIG. 5, comprising

Further, while not being bound by any particular scientific theory, it was hypothesized that second harmonic generation could be leveraged for time-resolved imaging of individual bacteria. Similar to the above described colloidal suspension experiments, imaging experiments used a Ti: Sapphire laser as a fundamental light source operating at 800 nm, in which the diffraction limited focused beam was raster scanned (using a pair of galvonometer scanning mirrors) over the field of view of the sample. The resulting SHS signal (at 400 nm) was collected using a single element, non-descanned detection (NDD) photomultiplier tube detector. Of significance, as distinct from experiments with colloidal suspensions of cells, in which numerous cells are simultaneously examined for their interaction with MG, the imaging experiments allow one to monitor the response from each of the individual cells in a sample. FIG. 5A depicts representative time-resolved SHS images of MG interacting with *E. coli* (mc4100). Overall, while somewhat noisier, the kinetic trace for MG interacting with a single *E. coli* bacterium (FIG. 5B) is remarkably similar to the kinetic trace for MG interacting with an ensemble of *E. coli* (FIG. 2B). This suggests that SHS imaging is likewise capable of isolating the characteristic Gram-positive and Gram-negative kinetic responses and can hence be used as a means of interrogating typical Gram classification samples.

Figure 6:
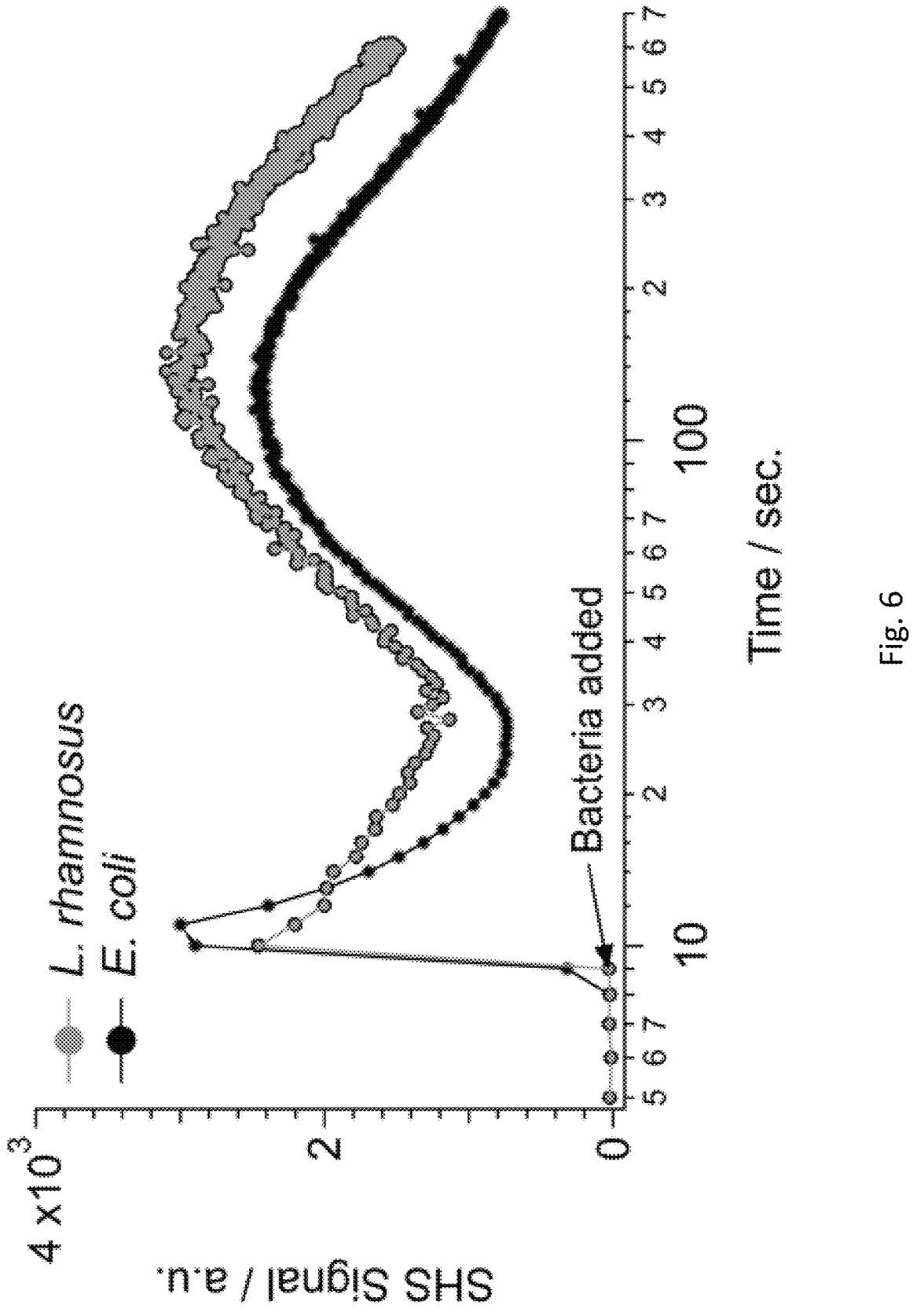
FIG. 6 depicts exemplary results demonstrating the time-resolved SHS responses for MG uptake in representative Gram-negative (*E. coli*, green) and Gram-positive bacteria (*L. rhamnosus*, black).

As further test to verify the viability of the Gram-positive sample, the uptake kinetics of MG in *L. rhamnosus* was also measured. Specifically, as previously revealed in the MG uptake experiment with Gram-negative *E. coli* (FIG. 2B), MG exhibits only a relatively weak interaction with the bacterial PM. It is therefore reasonable to speculate that, regardless of PM thickness, MG should readily diffuse across the PM and adsorb onto the exterior surface of the CM. This should hold true even for the substantially thicker PM's typical of Gram-positive strains. As depicted in FIG. 6 (green trace), this is exactly what is observed. The MG uptake kinetics for Gram-negative *E. coli* are also shown for comparison (black trace). Specifically, for both Gram-positive *L. rhamnosus* and Gram-negative *E. coli*, the measured SHS signals exhibit nearly identical transport curves which can be characterized as: 1) an initial rapid transport event across either the OM (*E. coli*) or the SL (*L. rhamnosus*), followed by 2) significantly slower transport across the bacterial CM.

The fact that MG is able to successfully sample all of the bacterial surfaces (and cross the much thicker PM) suggests that the Gram-positive sample is indeed alive (or at the very least, the components of the cell wall ultrastructure are still intact). Consequently, the fact that a secondary rise of SHS signal for CV interacting with the Gram-positive sample is not observed (FIG. 4; right) further supports our hypothesis that CV is trapped in the substantially thicker PM. This then begs the question, why should CV, but not the structurally similar MG, exhibit such a strong interaction with the bacterial PM? One possible explanation could be the pH of the solution and the relative charge state of each of the SH-active molecules under investigation. Specifically, at pH=7.2, more than 50% of the MG in solution are neutral. Conversely, under the same conditions, 100% of CV is cationic. It is therefore tempting to speculate that, while cationic MG may be sequestered in the PM, neutral MG is able to diffuse across the PM and then adsorb onto the CM. Indeed, as revealed in the pH dependent uptake study by Gayen et al. (*Anal. Chem.*, 2019, 91(12):7662-7671) under acidic conditions (pH=3, 4) in which MG is mostly cationic, the apparent propensity for MG to cross the thin PM of *E. coli* is reduced.

This is not the first distinguishing feature observed in the bacterial uptake of MG and CV. Recall, it was previously demonstrated that while MG is able to passively diffuse across the bacterial CM, CV does not. This behavior was demonstrated both in living cells as well as biomimetic liposomes (M. J. Wilhelm, et al., *ACS Chem. Biol.* 2015, 10: 1711-1717; Wilhelm M J, et al., *J. Chem. Phys.*, 2019, 150(10):104705). While not yet conclusive, it was speculated that a strong permanent dipole (which is symmetry allowed in MG but not in CV) may somehow account for this relative propensity to passively diffuse across a phospholipid membrane. Indeed, Haber and colleagues have since demonstrated that by increasing the magnitude of the permanent dipole of an MG derivative, the observed rate of passive transport was shown to increase (Hainal P, et al., *J Phys Chem B.*, 2019, 123(36):7722-7730). Nevertheless, here too, additional study will be necessary to fully decipher the physical origin of the differential uptake behaviors of MG and CV.

While a definitive understanding of the exact physical nature of the CV-PM interaction will require further study, it is still possible to take advantage of the striking difference between the measured SHS signal following uptake of CV by Gram-positive and Gram-negative bacteria. As highlighted in FIG. 4, the corresponding designations of positive and negative results (i.e. signal observed vs. signal lost, respectively) can be used to differentiate the two Gram-stain classifications of bacteria. Specifically, given that the late time SHS signal is dependent upon whether or not CV is able to cross the PM and adsorb onto the outer surface of the CM, Gram-negative cells show a signal gain (i.e., elicit a positive response) while Gram-positive cells show a net signal loss (i.e., negative response) at longer time behaviors. These time-dependent characteristic responses in the SHS signal could be exploited to form the basis of a new Gram-stain biosensor based upon nonlinear optical scattering.

Recall that the current Gram-stain protocol is a wet chemical assay that was serendipitously developed more than a century ago (C. Friedlander, *Fortschr. Med.* 1883, 1: 715-733; H. C. Gram, *Fortschr. Med.* 1884, 2: 185-189). It consists of several time-sensitive steps that require the skilled hand of an experienced operator to perform correctly. Errors in any of these steps, particularly heat fixation or the alcohol wash out step, can easily result in an incorrect assessment. Recent studies have highlighted the continued need for standardization of this classic method in order to eliminate known errors across labs and sample types (Thomson R B Jr., *J Clin Microbiol.*, 2016, 54(6):1416-1417; Samuel L P, et al., *J Clin Microbiol.*, 2016, 54(6):1442-4447). For example, a modest persistent error rate of roughly 5% has been reported across different labs (Samuel L P, et al., *J Clin Microbial.*, 2016, 54(6):1442-1447). However, this rate was shown to be heavily dependent upon the specific nature of the sample, for which wound swabs and respiratory samples exhibited considerably more substantial error rates of 33% and 38%, respectively (Samuel L P, et al., *J Clin Microbiol.*, 2016, 54(6):1442-1447). Gram-stain classification based upon nonlinear optics therefore offers a significant advantage in that none of the damaging steps of the classic protocol (i.e., heat fixation, alcohol washout) are necessary and hence the assessment can be made on healthy living cells.

Furthermore, it has recently been demonstrated that real-time molecular adsorption and transport can be monitored in individual living cells using SHS as an imaging modality (Sharifian Gh M, etal., *Biochemistry.* 2019, 58(14):1841-1844). Consequently, in addition to the SHS spectroscopy based results discussed above, SHS imaging of CV interacting with bacteria could likewise be used for Gram-stain classification. Conceptually, based upon the kinetic responses shown in FIG. 4, Gram-stain assessment using SHS imaging could consist of simply taking two time-dependent images. The first image, taken immediately after CV was added to the sample, would reveal the spatial locations of all cells in the sample, both Gram-positive and Gram-negative. The second image, taken at much later time (say t>1000 seconds), would consist of only Gram-negative cells, as the SHS signal from Gram-positive cells would now be well below the original baseline signal level. Consequently, by comparing the early time image (i.e., containing Gram-positive and Gram-negative cells) against the later time image (i.e., containing only Gram-negative cells), it would be feasible to categorize all of the cells (and their relative percentages) in a given sample. Additionally, SHS imaging has the added benefit that it would permit observation of the general morphology of the cells (e.g., *bacillus*, cocci) and would therefore allow for a more accurate assessment of the cells present in the sample.

In summary, the time-resolved SHS responses measured following the uptake of the Gram-stain dye, CV, in representative Gram-negative and Gram-positive bacteria has been characterized herein. The observed SHS responses were shown to be significantly influenced by a strong interaction between CV and the bacterial PM. For Gram-negative bacteria, which only possess a single thin layer of PM, CV was able to slowly traverse the PM and saturate the outer surface of the CM, resulting in a late time plateau in the measured SHS signal. Conversely, for Gram-positive bacteria which possess multiple layers of PM, CV was kinetically trapped within the thick PM, and did not arrive at the CM. Further, as a significant fraction (ca. 30%) of CV from the bulk extracellular solution was drawn into the Gram-positive cells, the SHS signal displayed a characteristic net loss in comparison with the nascent HRS background. While not being bound by scientific theory, it is proposed that these characteristic differences in time-resolved SHS signal, i.e., late time gain of signal for Gram-negative cells and net loss of signal for Gram-positive cells, can be used as the basis for a biosensor for Gram-stain differentiation of living bacteria. Further, based upon recent SHS imaging results (Sharifian Gh M, etal., *Biochemistry.* 2019, 58(14):1841-1844), this nonlinear optical based Gram-stain assay may be implemented using SHS imaging, in which the general morphology of the cells could also be assessed.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of determining bacterial cell wall composition comprising the steps of:
   a. measuring a first second-harmonic scattering (SHS) signal of a crystal violet (CV) solution to generate a baseline;
   b. adding a bacterial specimen to said solution to generate a suspension;
   c. measuring a second SHS signal of said suspension to generate a response;
   d. determining whether said response is above or below said baseline; and
   e. identifying the bacterial cell wall of the bacterial specimen as that of a Gram-positive bacterium if the response is below said baseline or identifying the bacterial cell wall of the bacterial specimen as that of a Gram-negative bacterium if the response is above said baseline by a Gram-stain biosensor using nonlinear optical scattering.

2. The method of claim 1, wherein said measuring of said first or said second SHS signal comprises:
   a. exposing said solution or said suspension to a fundamental light source; and
   b. detecting the second-harmonic wavelength of said light.

3. The method of claim 2, wherein said fundamental light has a wavelength of about 800 nm.

4. The method of claim 3, wherein the source of said about 800 nm fundamental light is a titanium-sapphire laser.

5. The method of claim 2, wherein said second-harmonic wavelength is about 400 nm.

6. The method of claim 5, wherein said about 400 nm second-harmonic wavelength is passed through a band-pass filter and monochromator, detected by a photomultiplier, amplified, and processed through a correlated photon counting system.

7. The method of claim 6, wherein said band-pass filter and monochromator excludes light of a wavelength of said fundamental light.

8. The method of claim 1, wherein said small molecule is taken up by said bacterial specimen.

9. The method of claim 1, wherein said CV is present at a concentration of at least 35 μM.

10. The method of claim 9, wherein said CV is present at a concentration of about 50 μM.

11. The method of claim 1, wherein said baseline is measured for between 1-100 seconds.

12. The method of claim 1, wherein said response is measured for at least 100 seconds.

* * * * *